United States Patent
Yoo et al.

(10) Patent No.: US 7,604,892 B2
(45) Date of Patent: Oct. 20, 2009

(54) Y AND NB-DOPED SRTIO₃ AS A MIXED CONDUCTING ANODE FOR SOLID OXIDE FUEL CELLS

(75) Inventors: Yeong Yoo, Nepean (CA); Serguei Koutcheiko, Vars (CA)

(73) Assignee: National Research Council of Canada, Ontario (CA)

( * ) Notice: Subject to any disclaimer, the term of this patent is extended or adjusted under 35 U.S.C. 154(b) by 861 days.

(21) Appl. No.: 10/875,163

(22) Filed: Jun. 25, 2004

(65) Prior Publication Data

US 2004/0265669 A1    Dec. 30, 2004

Related U.S. Application Data

(60) Provisional application No. 60/482,714, filed on Jun. 27, 2003.

(51) Int. Cl.
*H01M 4/90* (2006.01)
*H01M 8/10* (2006.01)

(52) U.S. Cl. ......................................... 429/40; 423/155

(58) Field of Classification Search .................. 429/40; 423/155

See application file for complete search history.

(56) References Cited

U.S. PATENT DOCUMENTS

| | | | | |
|---|---|---|---|---|
| 4,485,094 A | * | 11/1984 | Pebler et al. ................... 427/74 |
| 5,298,235 A | * | 3/1994 | Worrell et al. ................. 429/33 |
| 5,338,334 A | * | 8/1994 | Zhen et al. ..................... 75/362 |
| 5,411,767 A | * | 5/1995 | Soma et al. .................. 427/453 |
| 5,597,769 A | * | 1/1997 | Kim et al. .................... 501/136 |

FOREIGN PATENT DOCUMENTS

WO    WO00/64814    11/2000

OTHER PUBLICATIONS

P. R. Slater, J.T.S. Irvine, Solid State Ionics, 120, 125-134 (1999).
P.R. Slater, D.P. Fagg, J.T.S. Irvine, J. Mater. Chem., 7(12),2495 (1997).

* cited by examiner

*Primary Examiner*—Mark Ruthkosky
(74) *Attorney, Agent, or Firm*—J. Wayne Anderson

(57) ABSTRACT

The invention disclosed relates to novel materials of the general formula $$(Sr_{1-1.5x}M1_x)_{1-y/2}Ti_{1-y}M2_yO_3 \qquad [I]$$

wherein M1 is a first trivalent dopant metal atom replacing some of the strontium atoms on a strontium sub-lattice, x is a mole percent of said dopant atoms M1 on the strontium sub-lattice and $0<x\leq0.04$, and M2 is a second pentavalent dopant metal atom replacing some titanium atoms on a titanium sublattice, y is a mole percent of said dopant atoms M2 on the titanium sublattice and $0<y\leq0.2$. Also disclosed is a novel reduced form of the compounds of formula I, ie. compounds of formula $(Sr_{1-1.5x}M1_x)_{1-y/2}Ti_{1-y}M2_yO_{3-\delta}$ II. The variability in oxygen content between the oxidized and reduced forms of these compounds corresponds to $0<\delta\leq0.7$. These novel compounds maintained a stable single phase at both high and low oxygen partial pressures. Also disclosed is a solid oxide fuel cell including an anode made of the novel compounds of formula I.

20 Claims, 6 Drawing Sheets

Y AND NB-DOPED SRTIO₃ AS A MIXED CONDUCTING ANODE FOR SOLID OXIDE FUEL CELLS

This application claims the benefit of U.S. application Ser. No. 60/482,714, filed Jun. 27, 2003.

BACKGROUND OF THE INVENTION

This invention relates to $SrTiO_3$ co-doped with a first trivalent metal dopant atom (e.g. yttrium) replacing some of the Sr atoms on a strontium sub-lattice in the A site of the molecule and a second pentavalent dopant metal atom (e.g. niobium) replacing some of the Ti atoms on a titanium sub-lattice in the B site of the molecule, and to solid oxide fuel cells including an anode made of the co-doped $SrTiO_3$.

The solid oxide fuel cell (SOFC) is one of the most advanced systems for generating electricity in an efficient and environmentally friendly way. It can operate on a variety of fuels in addition to hydrogen, and may find applications from transportation to stationary systems (1, 2).

There has been a long history of research on the application of cermets (ceramic-metal composites) of nickel and yttria stabilized zirconia (YSZ) as anodes in solid oxide fuel cells. However, Ni—YSZ has a number of drawbacks including sintering of the Ni particles at high operating temperatures, sulfur poisoning and carbon deposition when the SOFC is fuelled by natural gas, reliance on a triple phase junction for the electrochemical reaction and cost. Ni—YSZ cermet anodes cannot be used in pure methane without pre-reforming. Therefore, an alternative material with adequate conductivity (>50-100 S/cm at 800-1000° C.) and catalytic activity toward total or partial oxidation of methane is necessary. Mixed ionic-electronic conductor (MIEC) oxides, either perovskite type (3-5) or non-perovskite (6-9) type, exhibiting high ionic and electronic conductivities at elevated temperatures are attractive candidates for SOFC electrodes. Mixed conductors are believed to relax the limitation attributed to electronic conducting electrodes by expanding the active reaction zone to include the whole of the electrode-gas interface instead of so-called triple phase boundary area (10).

SUMMARY OF THE INVENTION

According to one embodiment of the invention, a novel compound of general formula I is provided

I wherein M1 is first trivalent dopant metal atom replacing some strontium atoms on a strontium sublattice, x is a mole percent of said dopant atoms M1 on the strontium sublattice and $0<x\leq0.04$, and M2 is second pentavalent dopant metal atom replacing some titanium atoms on a titanium sublattice, y is a mole percent of said dopant atoms M2 on the titanium sublattice and $0\leq y\leq0.2$.

According to an aspect of this embodiment of the invention, M1 is yttrium ($Y^{+3}$) and wherein x is in a range from 0 to 4 mole % and M2 is niobium ($Nb^{+5}$) and wherein y is in a range from 0 to 20 mole %.

According to another aspect of this embodiment of the invention, $0<x\leq0.04$ and $0\leq y\leq0.2$.

According to yet another aspect of this embodiment of the invention $x=0.04$ and $0\leq y\leq0.2$.

According to yet another aspect of this embodiment of the invention, $0.03\leq x\leq0.04$ and $0.05\leq y\leq0.20$.

According to another embodiment of the invention, a novel compound of general formula II is provided

II, wherein M1 is first trivalent dopant metal atom replacing some strontium atoms on a strontium sublattice, x is a mole percent of said dopant atoms M1 on the strontium sublattice and $0<x\leq0.04$, and M2 is second pentavalent dopant metal atom replacing some titanium atoms on a titanium sublattice, y is a mole percent of said dopant atoms M2 on the titanium sublattice and $0\leq y\leq0.2$ and $\delta$ is in a range from 0 to about 0.07.

According to an aspect of this embodiment of the invention, M1 is yttrium ($Y^{+3}$) and wherein x is in a range from 0 to 4 mole % and M2 is niobium ($Nb^{+5}$) and wherein y is in a range from 0 to 20 mole %.

According to another aspect of this embodiment of the invention, $0<x\leq0.04$ and $0\leq y\leq0.2$.

According to yet another aspect of this embodiment of the invention $x=0.04$ and $0\leq y\leq0.2$.

According to yet another aspect of this embodiment of the invention, $0.03\leq x\leq0.04$ and $0.05\leq y\leq0.20$.

According to another embodiment of the invention, a process is provided for making a compound of formula I.

That is, the compounds of formula I were prepared in air in which the A-site deficiency is introduced to balance the charge difference of partially substituting $Y^{3+}$ for $Sr^{2+}$ and $Nb^{5+}$ for $Ti^{4+}$. The stoichiometric ratios of A site elements ($Sr^{2+}$, $Y^{3+}$) and B site elements ($Ti^{4+}$, $Nb^{5+}$) were adjusted to match the electrically neutral condition under oxidation atmosphere.

The compounds of formula I with all species in their fully oxidized states are then partially reduced at elevated temperature in a forming gas e.g. Ar-8% $H_2$, to obtain the novel oxygen deficient compounds of formula 11.

Figure 6:
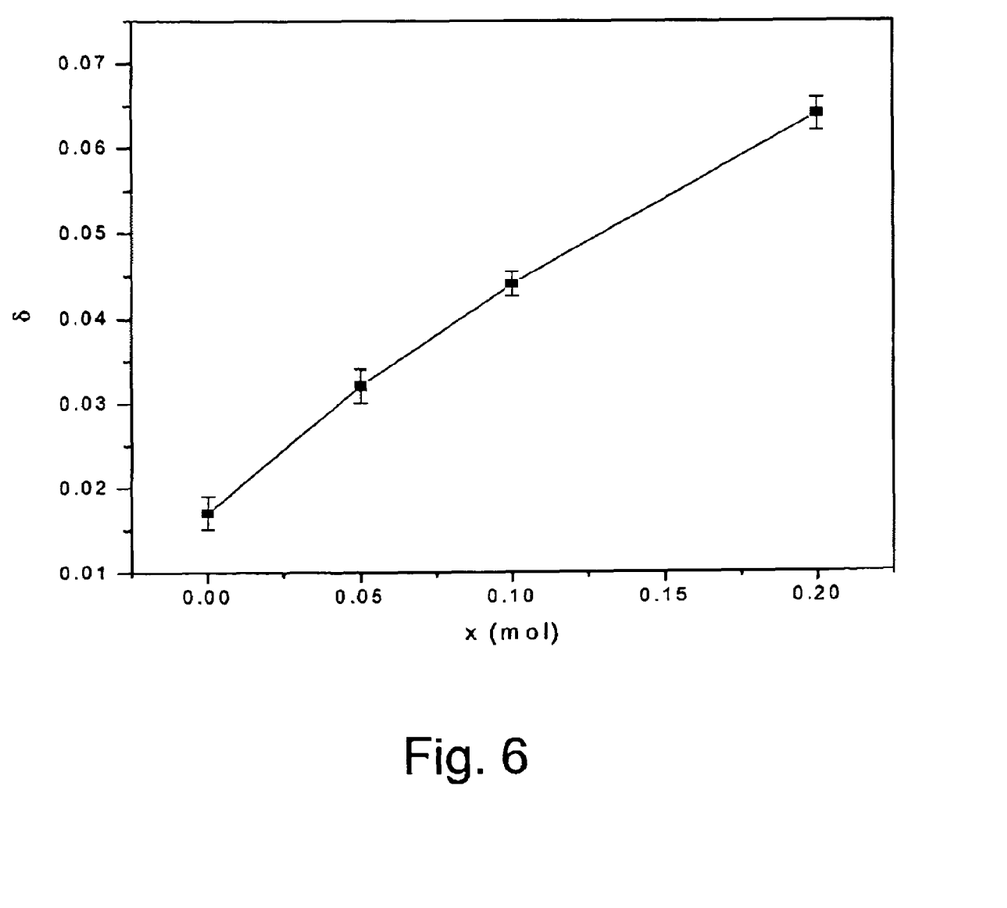
FIG. 6 is a graph of oxygen deficiency versus doping level of niobium in $(Sr_{0.94}Y_{0.04})_{1-y/2}Ti_{1-y}Nb_yO_{3-\delta}$.

Therefore, "$\delta$"(delta) will be "0" under air. However, the coupling of $Ti^{4+}/Nb^{5+}$ can be reduced to $Ti^{3+}/Nb^{4+}$ under reducing atmosphere at high temperature. Empirically we calculated the $\delta$ (delta) of the formula II based on thermogravimetric data as shown in FIG. 6. The range of $\delta$ (delta) depends on the range of y in the formula and can be defined as $0\leq\delta\leq0.07$ in case of $0\leq y\leq0.2$ for $x=0.04$. In this case, both electronic and ionic conduction is achieved which is a favorable criterion for SOFC anode performance. The thermal and electrical behavior of these novel ceramics was measured, and is described below.

According to another embodiment of the invention, a solid oxide fuel cell is provided, comprising a laminate of a cathode, an anode and an electrolyte sandwiched between said cathode and anode, said anode comprising a compound of general formula $(Sr_{1-1.5x}M1_x)_{1-y/2}Ti_{1-y}M2_yO_3$ I, wherein M1 is first trivalent dopant metal atom replacing some strontium atoms on a strontium sub-lattice, x is a mole percent of said dopant atoms M1 on the strontium sub-lattice and $0<x\leq0.04$, and M2 is second pentavalent dopant metal atom replacing some titanium atoms on a titanium sub-lattice, y is a mole percent of said dopant atoms M2 on the titanium sub-lattice and $0\leq y\leq0.2$.

According to an aspect of this embodiment of the invention, M1 is yttrium ($Y^{3+}$) and wherein x is in a range from 0 to 4 mole % and M2 is niobium ($Nb^{5+}$) and wherein y is in a range from 0 to 20 mole %.

According to another aspect of this embodiment of the invention, $0.03\leq x\leq0.04$ and $0.05\leq y\leq0.20$.

According to another aspect of this embodiment of the invention, $x=0.04$ and $y=0.20$.

According to another aspect of this embodiment of the invention, the electrolyte is yttrium stabilized zirconia (YSZ) and the anode has chemical stability therewith at operating temperature and also at the SOFC sintering temperature of up to 1350° C. It will be appreciated by those skilled in the art that the electrolyte and cathode may be made of any materials conventionally used for such components in commercial SOFC fuel cells. For examples of such materials see refs. 13 and 14, the disclosures of which are incorporated herein by reference.

According to another aspect of this embodiment of the invention, the anode includes a metallic catalyst and/or a ceramic catalyst mixed with said compound of formula I, for increasing conductivity and/or catalytic activity of said anode.

According to another aspect of this embodiment of the invention, the metallic catalyst is selected from the group consisting of iron, cobalt, nickel, copper and alloys thereof.

According to another aspect of this embodiment of the invention, the ceramic catalyst is selected from the group consisting of undoped cerium oxide, doped cerium oxide, lanthanum and chromium based perovskites.

According to another aspect of this embodiment of the invention, the solid oxide fuel cell is operated at a temperature ranging from 400° C. to 1000° C., and wherein an anode compartment is operated at an oxygen pressure ranging from about $10^{-14}$ to about $10^{-22}$ atm.

In another embodiment of the invention, an electrolyte-supported single cell SOFC with $(Sr_{0.94}Y_{0.04})_{0.9}Ti_{0.8}Nb_{0.2}O_{2.93}$ as the anode was made and tested at 900° C. using forming gas (Ar-8% $H_2$) as a fuel.

DETAILED DESCRIPTION OF THE INVENTION

Compounds of formula $(Sr_{1-1.5x}Y_x)_{1-y/2}Ti_{1-y}Nb_yO_3$ wherein $0 < x \leq 0.04$ and $0 \leq y \leq 0.2$ were prepared by conventional solid-state reaction. High purity $SrCO_3$ (Aldrich, 99.9%), $Y_2O_3$ (Aldrich, 99.99%), $TiO_2$ (Alfa Aesar, 99.8%, rutile), and $Nb_2O_5$ (Aldrich, 99.9%) were intimately mixed in the appropriate ratios, and heated, in air, at 1000° C. for 5 h, then at 1200° C. for 10 h, and finally, reground and reheated at 1400° C. for 10 h. Dense pellets (17 mm diameter) and bars (ca. 5×2.5×20 mm) of each sample were obtained by pressing at 1000 kg/cm² and then sintering at 1400° C. for 4 h in forming gas (Ar-8% $H_2$). Polyvinyl alcohol (PVA) and polyethylene glycol (PEG) were used as the binder and the plasticizer, respectively. The compounds were sintered on yttria stabilized zirconia (YSZ) substrates. No reaction with the substrate was detected after sintering.

Diffraction patterns were recorded on powders and ceramics on a Bruker D8 Advanced X-ray diffractometer (Bruker AXS Inc.) with Cu $K_\alpha$ radiation. For accurate lattice parameter determination, silicon was chosen as a standard. Complete patterns were recorded over the range of $2\theta$ from 20 to 70°. The unit cell parameters were derived from a computerized least-squares refinement technique.

The conductivity measurements were made using a conventional four-probe technique. Pt mesh was attached to the surface with Pt paste 4082 (Ferro Inc.). The contacts were cured in situ under forming gas for 1 hour at 950° C. The temperature was then reduced to 800° C. to perform the conductivity measurements. Initially, argon with trace amounts of oxygen was allowed to leak into the measurement cell over a period of 5-6 hours and the conductivity monitored with changing oxygen partial pressure measured by a POAS micro-sensor (Setnag). The conductivity as a function of temperature was also recorded.

To determine the oxygen content in the reduced compounds, thermogravimetric analysis was performed using a Hi-Res TGA thermogravimetric analyzer (TA Instruments). The samples were oxidized by heating at 5° C./min up to 1000° C. in flowing air.

Thermal expansion coefficients were measured in the temperature range of 100-800° C. using TMA 2940 thermomechanical analyzer (TA Instruments).

Figure 1:
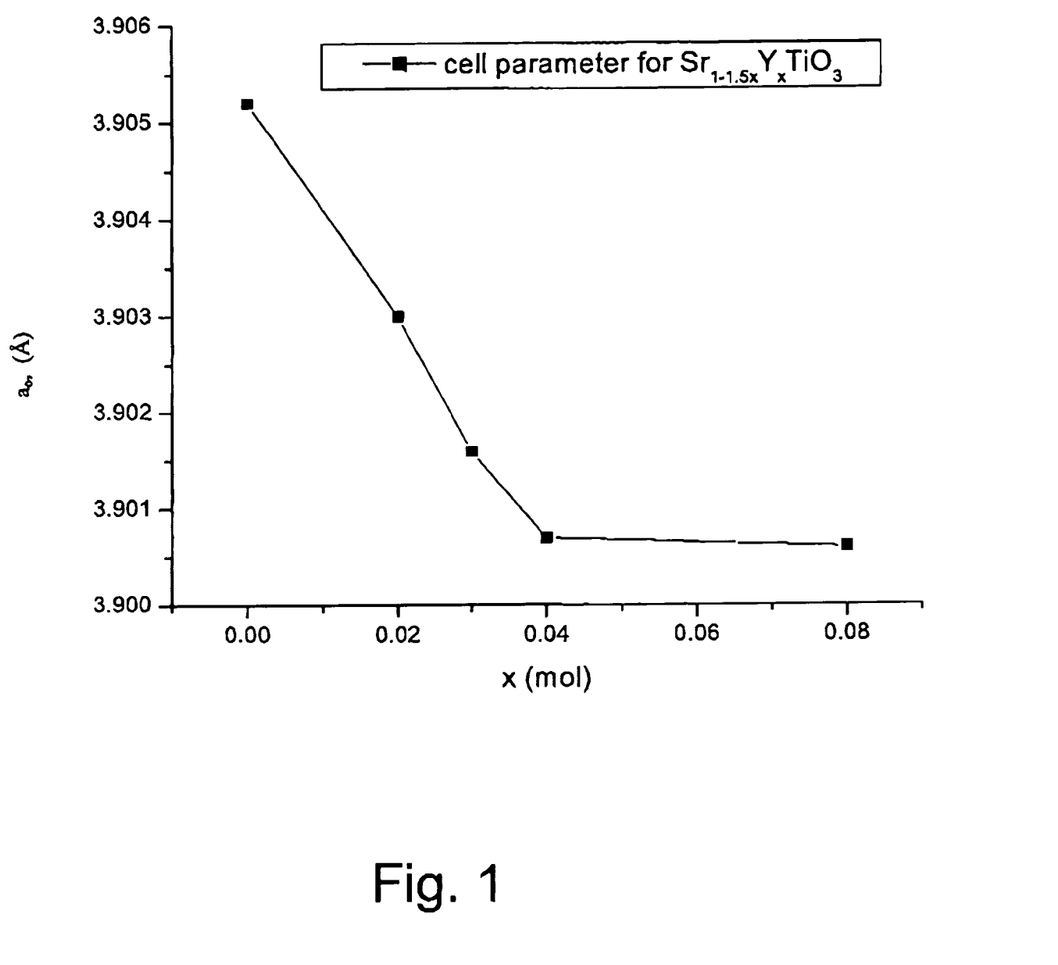
FIG. 1 is lattice parameters of yttrium doped strontium titanate as a function of the concentration of yttrium.
Figure 2:
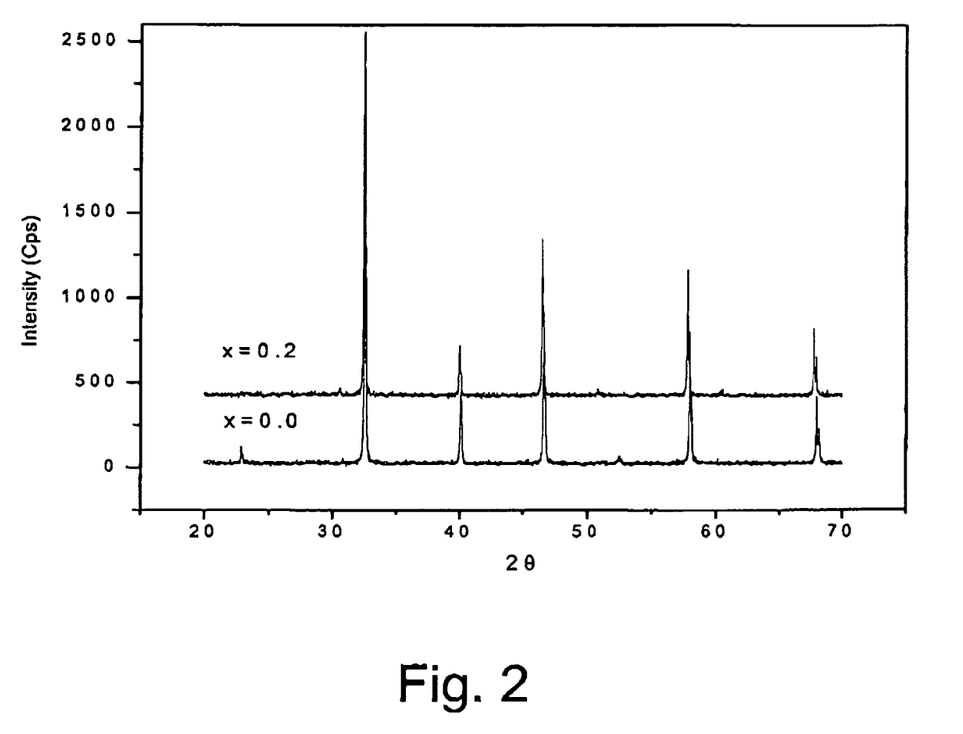
FIG. 2 is a graph illustrating XRD patterns of $(Sr_{0.94}Y_{0.04})_{1-y/2}Ti_{1-y}Nb_yO_3$ sintered in air at 1400° C. for 4 h.
Figure 3:
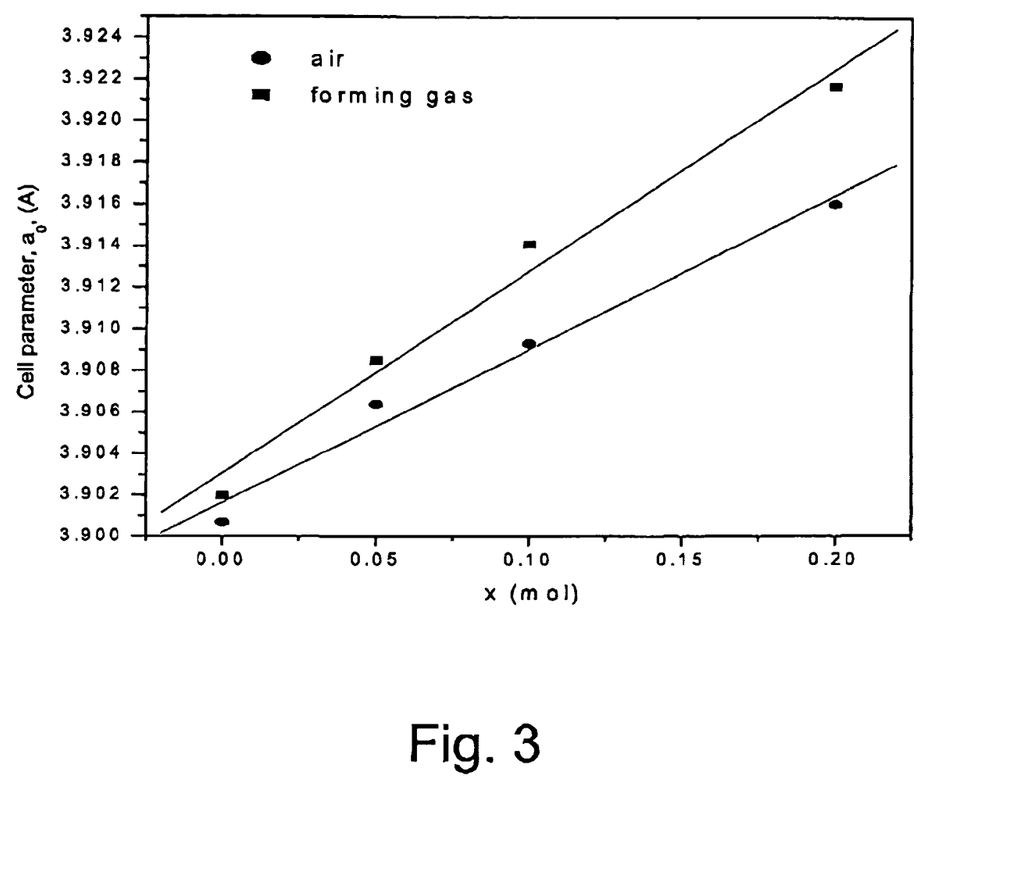
FIG. 3 is a graph illustrating variation of the lattice parameters of $(Sr_{0.94}Y_{0.04})_{1-y/2}Ti_{1-y}Nb_yO_{3-\delta}$ sintered in air and forming gas.

The lattice parameters of perovskite yttrium doped strontium titanate as a function of yttrium contents are shown in FIG. 1. It can be seen that single-phase cubic perovskite-type solid solutions of yttrium doped strontium titanate were observed for compositions containing up to 4 mol % of yttrium. The effect of yttrium doping into perovskite strontium titanate on enhancing mixed conductivity under reducing atmosphere was well described in literature (3). The conductivity was found to increase with increasing concentration of yttrium. Therefore compounds of Y and Nb co-doped strontium titanate with 4 mol % doping of yttrium were investigated to determine the effect of the solid solubility of niobium on the titanium sublattice. Single-phase compounds were observed by powder X-ray diffraction for y<0.2. For y=0.2 nearly single-phase samples were observed with a very small extra peak at $2\theta=30.5°$ (see FIG. 2). This peak can be assigned to $Y_2Ti_2O_7$. Therefore, niobium probably decreases the solubility level of yttrium in $SrTiO_3$. Any further increase of Nb in the system results in an increase of second phase content. Cell parameters for the $(Sr_{0.94}Y_{0.004})_{1-y/2}Ti_{1-y}Nb_yO_{3-\delta}$ compounds sintered in air and forming gas at 1400° C. are given in Table 1. As the Nb content increases, the unit cell expands (see FIG. 3), due to the larger radius of $Nb^{5+}$ (0.64 Å) versus $Ti^{4+}$ (0.605 Å) (11). The diffraction patterns resemble very closely that of cubic $SrTiO_3$. Lattice parameters were determined by indexing the diffraction peaks by analogy with those of $SrTiO_3$. On reduction all samples exhibited an approximate 0.03-0.15% expansion in crystallographic unit cell size due to the larger sizes of $Ti^{3+}$ (0.67 Å) and $Nb^{4+}$ (0.68 Å).

TABLE I

Crystallographic unit cell parameters and densities calculated from the crystallographic data for $(Sr_{0.94}Y_{0.04})_{1-y/2}Ti_{1-y}Nb_yO_{3-\delta}$ sintered in air and forming gas at 1400° C. for 4 hours.

| | $a_0$, Å | | Expansion, | Calculated density,/ $cm^3$ | |
| --- | --- | --- | --- | --- | --- |
| Y | Air | FG | % | Air | FG |
| 0 | 3.9007 | 3.9020 | 0.033 | 5.085 | 5.073 |
| 0.05 | 3.9064 | 3.9085 | 0.054 | 5.066 | 5.044 |
| 0.10 | 3.9093 | 3.9141 | 0.122 | 5.057 | 5.019 |
| 0.20 | 3.9160 | .9217 | 0.145 | 5.037 | 4.987 |

Figure 4:
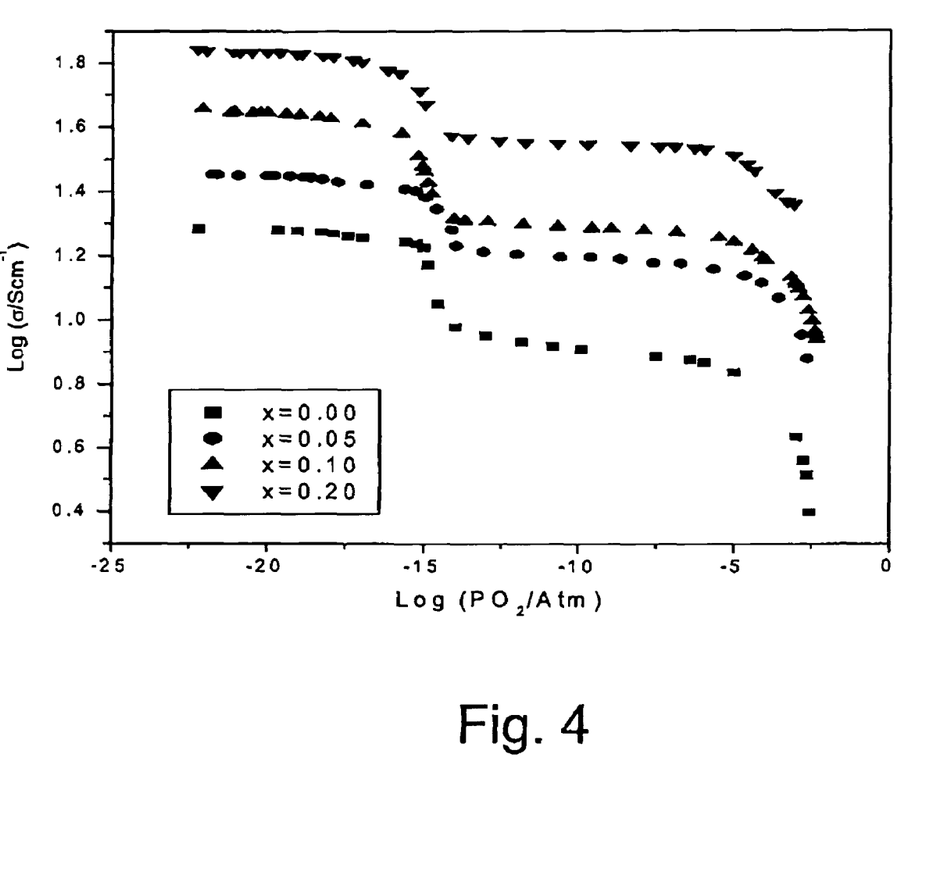
FIG. 4 is a graph illustrating the electrical conductivity of $(Sr_{0.94}Y_{0.4})_{1-y/2}Ti_{1-y}Nb_yO_{3-\delta}$ at 800° C. as a function of oxygen partial pressure.

Four probe dc conductivity measurements of the compounds measured at 800° C. over a wide range of oxygen partial pressures are shown in FIG. 4. The conductivity of all Nb-doped titanates increases slightly with decreasing oxygen partial pressures, indicating n-type conductivity predominated under reducing conditions. The electron concentration, or $Ti^{3+}/Nb^{4+}$ concentration is saturated by the Nb doping level, and the conductivities were only a weak function of oxygen partial pressure in the range $10^{-22}$-$10^{-15}$ atm. One may see that the Y and Nb co-doped compound with x=0.04 and y=0.2 has much higher conductivity than $Sr_{0.94}Y_{0.04}TiO_3$ at 800° C. in the whole range of oxygen partial pressures measured. It would be desirable to use this material as a porous anode on which a thin layer of electrolyte is attached. Electrical conductivity of $(Sr_{1-1.5x}Y_x)_{1-y/2}Ti_{1-y}Nb_yO_{3-\delta}$ may be influenced by factors such as excess strontium/yttrium vacancies and the existence of $Ti^{3+}$ (or $Nb^{4+}$) which are produced under reducing conditions. Bulk densities and conductivities of the various $(Sr_{0.94}Y_{0.04})_{1-y/2}Ti_{1-y}Nb_yO_{3-\delta}$ compositions are given in Table 2.

TABLE 2

Density, oxygen deficiency and conductivity of $(Sr_{0.94}Y_{0.04})_{1-y/2}Ti_{1-y}Nb_yO_{3-\delta}$ sintered at 1400° C. in forming gas for various levels of Nb doping.

| Y | Bulk density, $g/cm^3$ | Relative density, % | $\delta$ | *Conductivity, S/cm |
| --- | --- | --- | --- | --- |
| 0 | 3.99 | 78.7 | 0.017 | 18.4 |
| 0.05 | 4.04 | 80.1 | 0.032 | 30.0 |
| 0.10 | 4.06 | 78.2 | 0.044 | 43.8 |
| 0.20 | 4.13 | 82.8 | 0.064 | 62.8 |

*Measured at 800° C. in forming gas.

Figure 5:
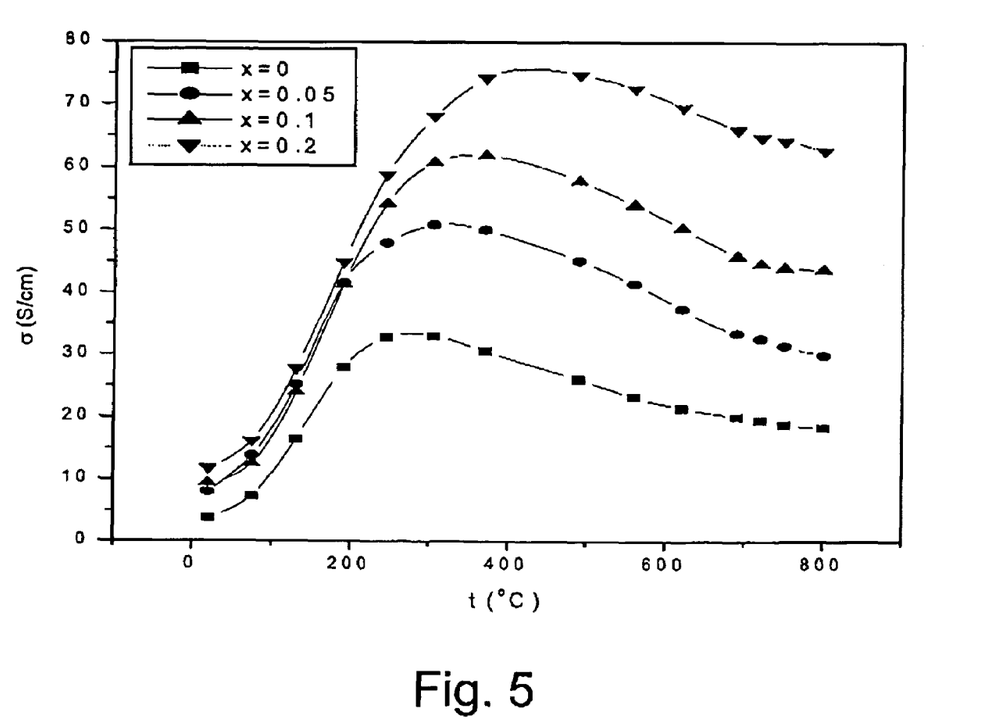
FIG. 5 is a graph illustrating the conductivity of $(Sr_{0.94}Y_{0.04})_{1-y/2}Ti_{1-y}Nb_yO_{3-\delta}$ versus temperature in forming gas.

For the proposed application as an anode in a SOFC, it is important to investigate the variation of conductivity of $(Sr0.94Y0.04)_{1-y/2}Ti_yNb_yO_{3-\delta}$ in forming gas as a function of temperature. FIG. 5 shows the conductivity measured from low to high temperature. It is well known that the oxygen partial pressure in forming gas is determined by the equilibrium:

$$H_2(g) + \tfrac{1}{2}O_2(g) \leftrightarrow H_2O(g)$$

and significantly decreases with decreasing temperature. Therefore, the increase of conductivity with decreasing temperature is very likely owing to the decrease of oxygen partial pressure. However, when the temperature approaches a kinetic limit (in this case 250-350° C.) the system may not be in thermodynamic equilibrium and the temperature mainly controls the generation of electrons rather than the reduction of oxygen partial pressure.

Thermogravimetric measurements were performed on $(Sr_{0.94}Y_{0.04})_{1-y/2}Ti_{1-y}Nb_yO_{3-\delta}$ compounds as prepared under reducing conditions. The compounds were heated under flowing air up to 1000° C. to complete oxidation. Measurements showed that oxidation of the compounds begins at 840-870° C. The weight gain associated with the oxidation process was used to determine the amount of oxygen per formula unit. The calculated oxygen deficiency as a function of Nb content is plotted in FIG. 6. The $\delta$ monotonically increases with increasing Nb concentration.

The thermal expansion coefficients of $(Sr0.94Y_{0.04})_{1-y/2}Ti_{1-y}Nb_yO_{3-\delta}$ compounds were compared with that of $(Y_2O_3)_{0.08}(ZrO_2)_{0.92}$. All materials showed near linear expansion, with similar thermal expansion coefficients. The observed value of $\alpha=11.6\times10^{-6}K^{-1}$ (from 100° C. to 800° C.) for y=0.2 was close to the $10.8\times10^{-6}K^{-1}$ reported for YSZ (12). The measured thermal expansion coefficients of the other Nb-doped (y<0.2) ceramics were a little higher, in the range 11.6-12.7$\times10^{-6}K^{-1}$.

The anode material must have chemical compatibility with the electrolyte, not only at operating temperature but also at the higher temperatures that the anode is exposed to during the fabrication of the SOFC. Chemical compatibility was tested by grinding a 1:1 (by weight) mixture of TZ-8Y (Tosoh Zirconia) and $(Sr_{0.94}Y_{0.04})_{0.9}Ti_{0.8}Nb_{0.2}O_3$ and firing at 1350° C. for 10 h in forming gas. No changes in the X-ray patterns were observed after this heat treatment.

$(Sr_{0.94}Y_{0.04})_{1-y/2}Ti_{1-y}Nb_yO_{3-\delta}$ compounds have suitable features for application as an anode material for a SOFC in the sense that they are stable in both air and reducing conditions, exhibit quite high (62.8 S/cm at y=0.2) conductivity in low $Po_2$, and do not show any evidence of chemical reaction with YSZ electrolyte even at 1350° C.

A single cell SOFC was made by screen-printing $(Sr_{0.94}Y_{0.04})_{0.9}Ti_{0.8}Nb_{0.2}O_3$-glycol slurry on one side of a YSZ disc (18 mm diameter, 0.35 mm thick) and firing at 1200° C. in forming gas. Pt paste (Ferro Inc.) was applied on other side of the disk as the cathode. Forming gas saturated with water vapor at 20° C. was delivered to the anode and air was provided to the cathode. Unfortunately the cell showed poor power density (max 15 mW/cm² at 900° C.). Specific electrode interfacial resistance was roughly estimated at 700 $\Omega \cdot cm^2$. This indicates that the main problem may lie with the interface contacts, rather than with the bulk properties of the anode.

REFERENCES

1. M. C. Williams, in Solid Oxide Fuel Cells VI, S. C. Singhal, M. Dokiya, Editors, PV 99-19 p. 3, The Electrochemical Society Proceedings Series, Pennington, N.J. (1999).
2. H. Yokokawa, in Solid Oxide Fuel Cells VI, S. C. Singhal, M. Dokiya, Editors, PV 99-19 p. 10, The Electrochemical Society Proceedings Series, Pennington, N.J. (1999).
3. S. Hui, A. Petric, J. Electrochem. Soc., 149 (1) J1-J10 (2002).
4. T. Kawada, N. Iizawa, L-Q. Han, K. Yashiro, A. Kaimai, Y. Nigara, and J. Mizusaki in: in Proc. 2001 Joint Int. Meeting, Electrochem. Soc., Abstract No 1558.
5. P. R. Slater, D. P. Fagg, J. T. S. Irvine, J. Mater. Chem., 7 (12), 2495 (1997).
6. D. P. Fagg, S. M. Fray, J. T. S. Irvine, Solid State Ionics, 72, 235 (1994)
7. O. Porat, M. A. Spears, C. Heremans, I. Kosacki, H. L. Tuller, Solid State Ionics, 86-88, 285 (1996).
8. P. R. Slater, J. T. S. Irvine, Solid State Ionics, 124, 61 (1999).

9. H. L. Tuller, Solid State Ionics, 94, 63 (1997).
10. H. L. Tuller, in High Temperature Electrochemistry: Ceramics and Metals, Editors F. W. Poulsen et. al. Riso National Laboratory, Roskilde, Denmark, p. 139 (1996).
11. R. D. Shannon, Acta Crystallogr. A32, 751 (1976)
12. R. Maenner, E. Ivers-Tiffee, W. Wersing, and W. Kleinlein in: Proc. $2^{nd}$ Int. Symp. on Solid Oxide Fuel Cells, eds. F. Gross, P. Zegers, S. C. Singhal and D. Yamamoto (CEC, Luxemburg, 1991) p. 715
13. B. C. H. Steele, Solid State Ionics, 134, 3-20 (2000)
14. F. Tietz et al., Solid State Ionics, 152-153, 373-381, (2002)

The invention claimed is:

1. A compound having a formula I;

$$(Sr_{1-1.5x}M1_x)_{1-y/2}Ti_{1-y}M2_yO_3 \quad [I]$$

wherein M1 is a yttrium ($Y^{3+}$) dopant metal atom replacing some strontium atoms on a strontium sublattice, x is a mole percent of said dopant atoms M1 on the strontium sublattice and $0<x \leq 0.04$, and M2 is a niobium ($Nb^{5+}$) dopant metal atom replacing some titanium atoms on a titanium sublattice, y is a mole percent of said dopant atoms M2 on the titanium sublattice and $0<y \leq 0.2$.

2. The compound according to claim 1, wherein x is in a range from 0.02 to 0.04 and wherein y is in a range from 0.05 to 0.20.

3. The compound according to claim 1, wherein $0.03 \leq x \leq 0.04$ and $0.05 \leq y \leq 0.20$.

4. The compound according to claim 3, wherein x=0.04 and y=0.20.

5. The compound according to claim 1, wherein said compound has a mixed electronic and ionic conductivity greater than 5 S/cm at a temperature ranging from 400° C. to 1000° C. and an oxygen pressure ranging from about $10^{-14}$ to about $10^{-22}$ atm.

6. The compound according to claim 1, wherein said compound has a coefficient of thermal expansion (CTE) ranging from $11 \times 10^{-6} K^{-1}$ to $13 \times 10^{-6} K^{-1}$ under reducing atmosphere.

7. A compound having a formula II $$(Sr_{1-1.5x}M1_x)_{1-y/2}Ti_{1-y}M2_yO_{3-\delta} \quad II$$

wherein M1 is a yttrium ($Y^{3+}$) dopant metal atom replacing some strontium atoms on a strontium sublattice, x is a mole percent of said dopant atoms M1 on the strontium sublattice and $0<x \leq 0.04$, and M2 is a niobium ($Nb^{5+}$) dopant metal atom replacing some titanium atoms on a titanium sublattice, y is a mole percent of said dopant atoms M2 on the titanium sublattice and $0<y \leq 0.2$ and $0<\delta \leq 0.7$.

8. The compound according to claim 7, wherein x is in a range from 0.02 to 0.04 and wherein y is in a range from 0.05 to 0.20.

9. The compound according to claim 7, wherein $0.03 \leq x \leq 0.04$ and $0.05 \leq y \leq 0.20$.

10. A solid oxide fuel cell, comprising;
a laminate of a cathode, an anode and an electrolyte sandwiched between said cathode and anode, said anode comprising a compound of general formula $(Sr_{1-1.5x}M1_x)_{1-y/2}Ti_{1-y}M2_yO_3$ I, wherein M1 is a yttrium ($Y^{3+}$) dopant metal atom replacing some strontium atoms on a strontium sublattice, x is a mole percent of said dopant atoms M1 on the strontium sublattice and $0<x \leq 0.04$, and M2 is a niobium ($Nb^{5+}$) dopant metal atom replacing some titanium atoms on a titanium sublattice, y is a mole percent of said dopant atoms M2 on the titanium sublattice and $0<y \leq y \leq 0.2$.

11. The solid oxide fuel cell according to claim 10, wherein x is in a range from 0.02 to 0.04 and wherein y is in a range from 0.05 to 0.20.

12. The solid oxide fuel cell according to claim 10, wherein $0.03 \leq x \leq 0.04$ and $0.05 \leq y \leq 0.20$.

13. The solid oxide fuel cell according to claim 10, wherein x=0.04 and y=0.20.

14. The solid oxide fuel cell according to claim 10, wherein the electrolyte is yttrium stabilized zirconia (YSZ) and said anode has chemical stability therewith at operating temperature and also at the SOFC sintering temperature of up to 1350° C.

15. The solid oxide fuel cell according to claim 10, wherein said anode includes a metallic catalyst and/or a ceramic catalyst mixed with said compound of formula I, for increasing conductivity and/or catalytic activity of said anode.

16. The solid oxide fuel cell according to claim 10, wherein said metallic catalyst is selected from the group consisting of iron, cobalt, nickel, copper and alloys thereof.

17. The solid oxide fuel cell according to claim 15, wherein said ceramic catalyst is selected from the group consisting of undoped cerium oxide, doped cerium oxide, doped lanthanum and chromium based perovskites.

18. The solid oxide fuel cell according to claim 10, operating at a temperature ranging from 400° C. to 1000° C., and wherein an anode compartment is operated at an oxygen pressure ranging from about $10^{-14}$ to about $10^{-22}$ atm.

19. A process for producing a compound of formula I $$(Sr_{1-1.5x}M1_x)_{1-y/2}Ti_{1-y}M2_yO_3 \quad [I]$$

wherein M1 is a yttrium ($Y^{3+}$) dopant metal atom replacing some strontium atoms on a strontium sublattice, x is a mole percent of said dopant atoms M1 on the strontium sublattice and $0<x \leq 0.04$, and M2 is a niobium ($Nb^{3+}$) dopant metal atom replacing some titanium atoms on a titanium sublattice, y is a mole percent of said dopant atoms M2 on the titanium sublattice and $0<y \leq 0.2$, comprising, replacing some strontium atoms on a strontium sublattice of a compound of formula $SrTiO_3$ by a yttrium ($Y^{3+}$) dopant metal atom M1 and replacing some titanium atoms on a titanium sub-lattice by a niobium ($Nb^{5+}$) dopant metal atom M2, to balance the charge difference of partially substituting $Y^{3+}$ for $Sr^{2+}$ and $Nb^{5+}$ for $Ti^{4+}$, and adjusting the stoichiometric ratios of A site elements ($Sr^{2+}$, $Y^{3+}$) and B site elements ($Ti^{4+}$, $Nb^{5+}$) to match the electrically neutral condition under oxidation atmosphere.

20. A process for producing a compound of formula II, $$(Sr_{1-1.5x}M1_x)_{1-y/2}Ti_{1-y}M2_yO_{3-\delta} \quad II$$

wherein M1 is a yttrium ($Y^{3+}$) dopant metal atom replacing some strontium atoms on a strontium sublattice, x is a mole percent of said dopant atoms M1 on the strontium sublattice and $0<x \leq 0.04$, and M2 is a niobium ($Nb^{5+}$) dopant metal atom replacing some titanium atoms on a titanium sublattice, y is a mole percent of said dopant atoms M2 on the titanium sublattice and $0<y \leq 0.2$ and to $0<\delta \leq 0.7$ comprising partially reducing a compound of formula I as defined in claim 19 at elevated temperature in a forming gas.

* * * * *